(12) United States Patent
Batten et al.

(10) Patent No.: US 9,342,088 B2
(45) Date of Patent: May 17, 2016

(54) POWER POINT TRACKING

(75) Inventors: Robert Batten, Tualatin, OR (US);
Vincenzo DiTommaso, Beaverton, OR (US); Gary B. Baker, Sherwood, OR (US); Henry F. Pruett, North Bend, OR (US); Adam Heiberg, Tualatin, OR (US); Triet Tu Le, Portland, OR (US); Edward Gee, Camas, WA (US)

(73) Assignee: SunPower Corporation, San Jose, CA (US)

( * ) Notice: Subject to any disclaimer, the term of this patent is extended or adjusted under 35 U.S.C. 154(b) by 515 days.

(21) Appl. No.: 12/972,398

(22) Filed: Dec. 17, 2010

(65) Prior Publication Data

US 2011/0160930 A1 Jun. 30, 2011

Related U.S. Application Data

(60) Provisional application No. 61/291,613, filed on Dec. 31, 2009, provisional application No. 61/316,750, filed on Mar. 23, 2010.

(51) Int. Cl.
*H02J 1/00* (2006.01)
*G05F 1/67* (2006.01)

(52) U.S. Cl.
CPC ............... *G05F 1/67* (2013.01); *Y10T 307/707* (2015.04)

(58) Field of Classification Search
CPC ................. H01J 1/00; H02J 3/00; H02J 1/00
USPC .......................................................... 307/82
See application file for complete search history.

(56) References Cited

U.S. PATENT DOCUMENTS

| | | | | |
|---|---|---|---|---|
| 2004/0021445 A1* | 2/2004 | Harris | ...................... | G05F 1/67 320/136 |
| 2008/0150366 A1* | 6/2008 | Adest | ...................... | H02J 3/385 307/77 |

(Continued)

FOREIGN PATENT DOCUMENTS

EP     1983632 A2    10/2008

OTHER PUBLICATIONS

International Search Report and Written Opinion for PCT/US2010/062263, dated Sep. 22, 2011, 10 pages.

(Continued)

*Primary Examiner* — Thienvu Tran
*Assistant Examiner* — Joseph Inge
(74) *Attorney, Agent, or Firm* — Grasso PLLC

(57) ABSTRACT

A local power converter may include a controller to manipulate the operating point of a local power converter to cause the power point tracking feature of a central power converter to operate at a point determined by the controller. In some embodiments, the controller can manipulate the operating point of the local power converter by alternating between at least two modes. In some other embodiments, the controller can manipulate the operating point of the local power converter to provide a substantially constant slope. In some other embodiments, the controller can maintain a substantially constant impedance ratio. In some other embodiments, the controller enables perturbations from the power point tracking feature of the central power converter to reach the power source.

32 Claims, 13 Drawing Sheets

(56) References Cited

U.S. PATENT DOCUMENTS

| | | | | |
|---|---|---|---|---|
| 2009/0150005 A1* | 6/2009 | Hadar | ................... | H02J 13/002 700/286 |
| 2009/0206666 A1* | 8/2009 | Sella | ................. | H01L 31/02021 307/43 |
| 2009/0284078 A1* | 11/2009 | Zhang | ....................... | G05F 1/67 307/82 |
| 2009/0284232 A1* | 11/2009 | Zhang | ....................... | G05F 1/67 322/89 |
| 2009/0284240 A1* | 11/2009 | Zhang | ....................... | G05F 1/67 323/285 |
| 2010/0117623 A1* | 5/2010 | Fife | ........................... | G05F 1/67 324/76.11 |
| 2010/0207455 A1* | 8/2010 | Erickson, Jr. | ............. | G05F 1/67 307/82 |

OTHER PUBLICATIONS

International Preliminary Report on Patentability for PCT/US2010/062263, dated Jul. 4, 2012, 6 pages.

Search Report in Taiwan Patent Application No. 99145852 and English translation thereof (2 pp).

\* cited by examiner

POWER POINT TRACKING

CROSS-REFERENCE TO RELATED APPLICATIONS

This application claims priority from U.S. Provisional Patent Application Ser. No. 61/291,613 titled Power Point Tracking filed Dec. 31, 2009 and U.S. Provisional Patent Application Ser. No. 61/316,750 titled Inverter Interaction filed Mar. 23, 2010.

BACKGROUND

FIG. 1 illustrates a prior art energy conversion system in which an array of photovoltaic (PV) panels 10 are connected in series string to generate a DC bus voltage $V_{A+}, V_{A-}$ from the array. The DC bus voltage is converted to AC power in the form of an AC voltage $V_{AC}$ by an inverter 12.

Referring to FIG. 2, curve 16 illustrates the voltage-current characteristic (V-I curve) of a typical PV panel under certain operating conditions, while curve 18 illustrates the corresponding power characteristic (power curve) for the same panel under the same conditions. The V-I curve is zero volts with a value of $I_{SC}$ which is the short-circuit current generated by the panel when the output terminals are shorted together. As the output voltage increases, the V-I curve remains at a fairly constant level of current until it reaches a knee at which it descends rapidly toward zero current at $V_{OC}$, which is the open-circuit output voltage of the panel.

The power curve is simply the current times the voltage at each point along the V-I curve. The power curve has a maximum value corresponding to a certain voltage level and a certain current level. This is known as the maximum power point or MPP. The maximum power point tends to change based on changes in operating conditions such as illumination level, temperature, age of the panel, etc.

Inverters for PV systems typically include maximum power point tracking (MPPT) functionality that attempts to operate the system at the maximum power point. Since the maximum power point changes based on changes in operating conditions, algorithms have been devised for tracking the MPP as it changes over time. Conventional MPPT algorithms often employ a perturb and observe technique in which the operating voltage or current is varied, thereby causing the operating point to vary around the MPP as shown in FIG. 2. By observing the change in power as the voltage or current changes, the MPP can be determined.

In systems that only include a single PV panel, existing MPPT algorithms enable the system to operate at the true maximum power point for the single panel. In systems having multiple PV panels as shown in FIG. 1, existing MPPT algorithms 14 attempt to find the average maximum power point for the overall system. However, finding the average maximum power point for the system does not necessarily enable each individual panel to operate at its maximum power point. By not operating each panel at its maximum power point, the energy produced by the system may be reduced resulting in lost income and a longer return on investment. This loss of efficiency may be especially problematic with PV arrays that are subjected to shading in part of the array because the reduction in efficiency is often disproportionately larger than the area that is shaded.

DETAILED DESCRIPTION

Figure 1:
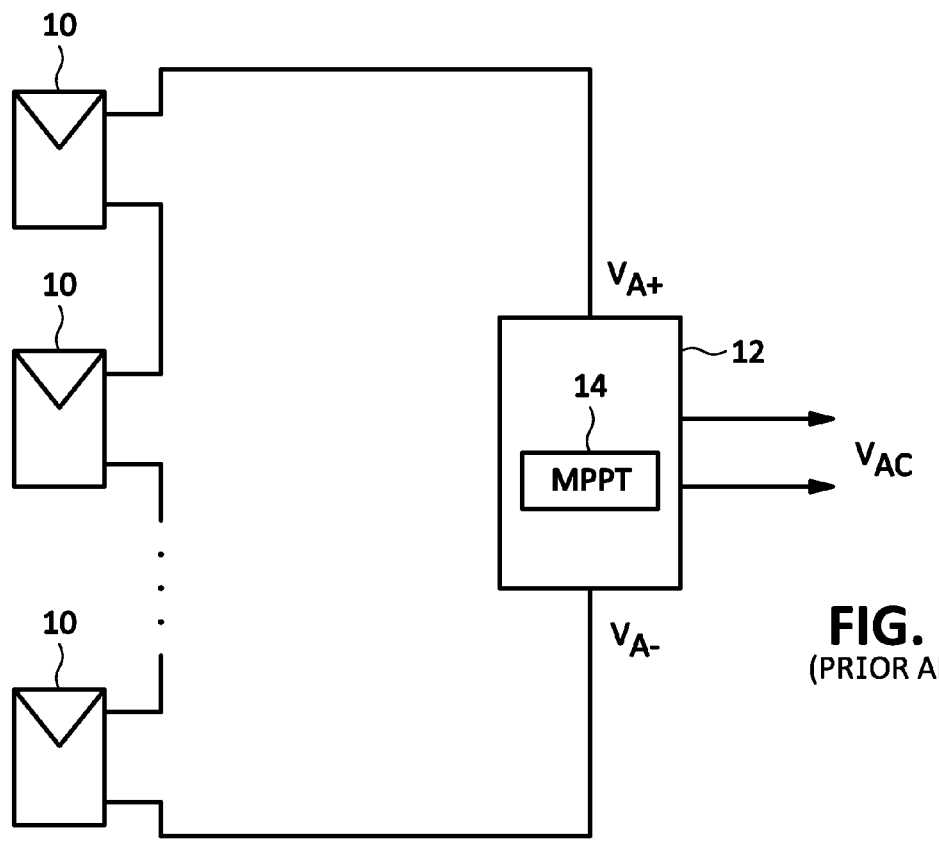
FIG. 1 illustrates a prior art photovoltaic energy conversion system.
Figure 2:
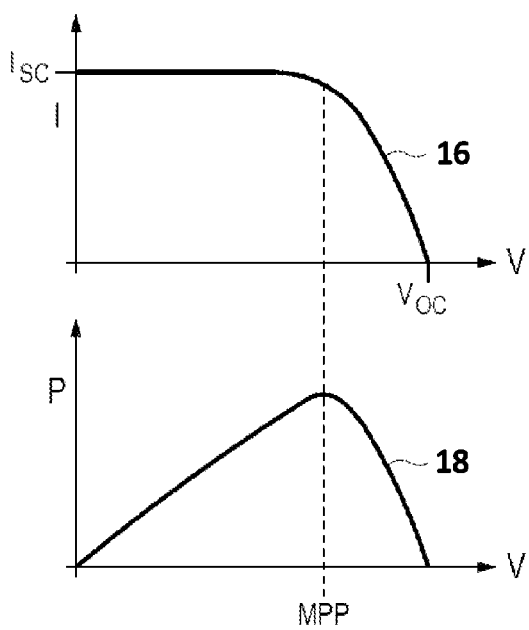
FIG. 2 illustrates the voltage-current curve and power curve of a typical PV panel.
Figure 3:
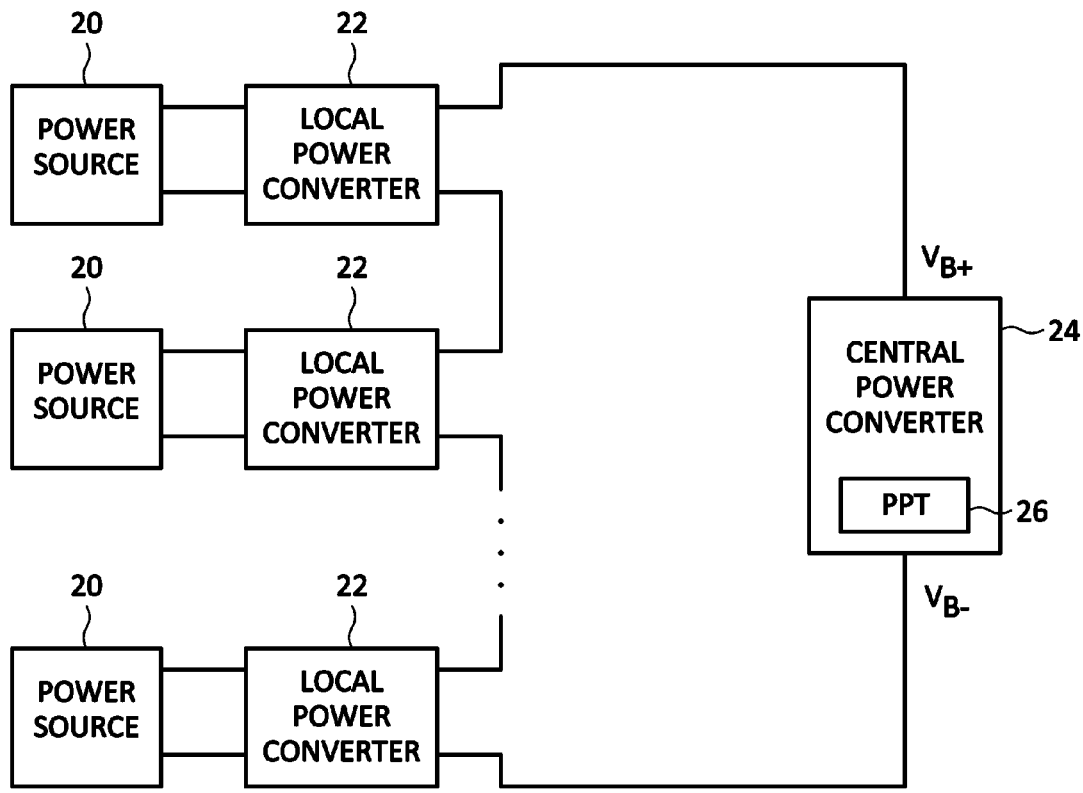
FIG. 3 illustrates an embodiment of an energy conversion system according to some inventive principles of this patent disclosure.

Some of the inventive principles of this patent disclosure relate to the use of local power converters to optimize the operating points of individual power sources that are connected to a centralized power converter. FIG. 3 illustrates an embodiment of an energy conversion system having local power converters according to some inventive principles of this patent disclosure. In the system of FIG. 3, each power source 20 has a corresponding local power converter 22 that includes a power conversion stage to transfer power from the power source to a central power converter 24 that includes a power point tracking (PPT) feature 26. The local power converters 22 are connected in a series string to generate a power bus $V_{B+}, V_{B-}$, but the inventive principles are not limited to any specific topology, power sources, power converters, etc.

For example, if the power sources are photovoltaic (PV) panels, the local power converters 22 may be implemented as DC/DC converters, and the central power converter 24 may be implemented as a DC/AC inverter having conventional MPPT functionality that attempts to operate the system at the maximum power point. However, to achieve the most energy from a PV system, especially under shading and inter-panel mismatch conditions, each panel may be individually optimized for a maximum power point. Thus, the local power converters 22 may be implemented as power optimizers (PO) that include local MPPT functionality to individually optimize their corresponding panels.

Figure 5:
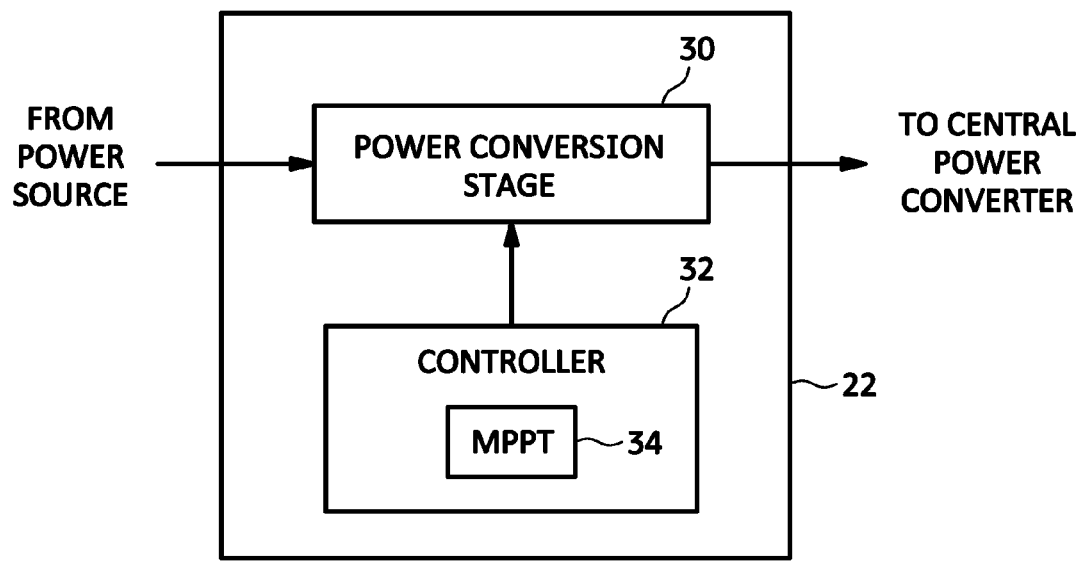
FIG. 5 illustrates an example embodiment of a local power converter 22 according to some inventive principles of this patent application.

FIG. 5 illustrates an example embodiment of a local power converter 22 according to some inventive principles of this patent application. A power conversion stage (PCS) 30 may be implemented with any suitable power conversion topology. For example, in a PV system, the PCS may be implemented as a buck converter, a boost converter, a buck-boost converter, a push-pull converter followed by a rectifier, or any other DC/DC converter topology. A controller 32 may be implemented with analog and/or digital hardware, software, firmware or any suitable combination thereof. Local power point tracking functionality 34 may likewise be implemented with analog and/or digital hardware, software, firmware or any suitable combination thereof. In a system with a controller based on a digital signal processor (DSP), the PPT functionality may be implemented as a pure software or firmware solution. The system of FIG. 5 may be used, for example, to implement any of the methods according to the inventive principles of this patent disclosure as described herein.

Figure 4:
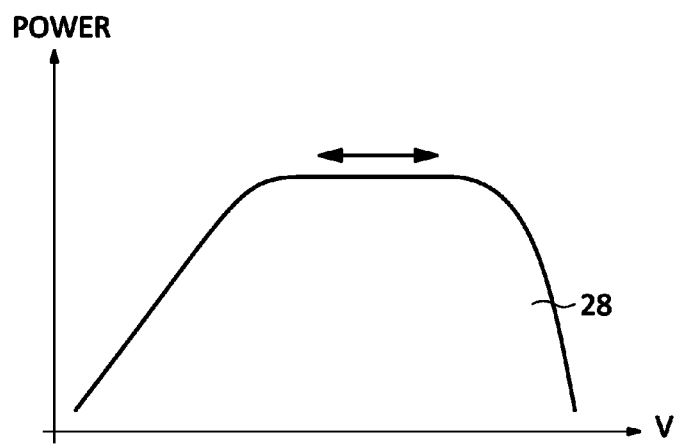
FIG. 4 illustrates the output power characteristic of a local power converter having an MPPT feature.

One potential problem with using a conventional inverter having MPPT functionality is that the addition of MPP tracking hardware and/or software at the panel level means that the system may have two or more independent MPP tracking systems. Since the panel level MPP tracking functionality may attempt to output constant power as shown in FIG. 4, regardless of the load impedance, the MPP tracking of the inverter may not see the panel behavior that it expects to see. In general, this may result in the inverter MPP system not being able to find an optimal operating point and constantly varying the system string voltage in a sometimes random manner as the operating point moves as shown by the arrows in FIG. 4.

Therefore, each local power converter 22 may include functionality to manipulate or optimize the operating point of the power source and/or the corresponding local power converter in a manner that may influence the PPT functionality 26 of the central power converter 24. For example, the PPT functionality in a local power converter 22 may cause the power point tracking feature of the central power converter to operate at a point determined by the local power converter. In some embodiments, control over the power point tracking feature of the central power converter may be achieved by manipulating the operation of the local power converter to cause the central power converter to see a slope in the power characteristic of the local power converter. Thus, the PPT functionality of the central power converter may be manipulated by giving it a direction in which to move in search of a maximum power point that it otherwise would not see.

Therefore, to provide a complete system solution, the maximum power point tracking hardware that is installed at each panel may interact with the central inverter. A potential benefit of the inventive principles is that hardware and/or software at the local level may work with most conventional central inverters and may not require special wiring, setup, configuration, software changes, etc., at either the system level or the inverter level. In other words, the inventive principles may enable dynamic control of the central power converter (e.g., inverter) operating point autonomously without any communication between the local power converters (e.g., power optimizers) and the central inverter to operate in an optimized region without having to change hardware and/or software in existing inverters. Moreover, the inventive principles may enable the implementation of a system that is suitable for use with a wide range of inverters from different manufacturers.

In a system according to some inventive principles of this patent disclosure, there may be specific output voltage and/or voltage ratio (duty cycle) ranges where efficiency is highest. It may be advantageous for the inverter to cause the system to operate in this region. When the system is in this region it may be advantageous for the inverter to believe that it is operating at the peak of the power curve for the system. As described below, there are numerous ways to accomplish this according to the inventive principles of this patent disclosure.

Fixed Duty Cycle Method

Some inventive principles of this patent disclosure relate to operating a local power converter in a fixed duty cycle mode that enables a central power converter to see the power curve of the local power source through the local power converter, instead of the flat power curve that would normally be presented by a local power converter implementing an MPPT algorithm. Operating at a fixed duty cycle essentially produces a fixed voltage ratio $V_R$ such that $V_R=V_O/V_I$ where $V_I$ and $V_O$ are the input and output voltages, respectively.

In one example embodiment, the local power converter may be implemented as a switching power converter such as a buck converter. In fixed duty cycle mode, the converter is operated at a fixed duty cycle which results in a fixed voltage ratio between the input and output voltages. The converter may initially begin operation in a normal mode using a conventional MPPT algorithm. Once the local power converter has found the MPP, the controller enters fixed duty cycle mode by maintaining the converter at a fixed duty cycle (or voltage ratio) corresponding to the MPP. This mode may essentially cause the local power converter to be transparent to the MPPT algorithm in a central power converter, thereby preventing the MPPT algorithm from wandering.

As a further refinement, limits may be placed on the amount of time and/or duty cycle (voltage ratio) in fixed duty cycle mode. For example, allowing the system to stay in a transparent, fixed duty cycle mode may negate the optimizing effect of local and/or system optimizers. To avoid this, the value of the current through the local power converter at the maximum power point just before entering fixed duty cycle mode may be saved. If the system current deviates too far from the saved current, for example, as a percent of the saved value, the local power converter (e.g., power optimizer) may return to normal MPPT mode since it apparently is not at an ideal operation point. Various thresholds may be used to determine when the system current or other parameter has deviated too far from the save value. For example, modes may be switched when the difference between the stored value and the presently measured instantaneous value of the parameter exceeds a predetermined limit. As another example, the threshold may be based on the difference between the stored value and the measured value exceeding a specific value for a predetermined length of time.

Figure 6:
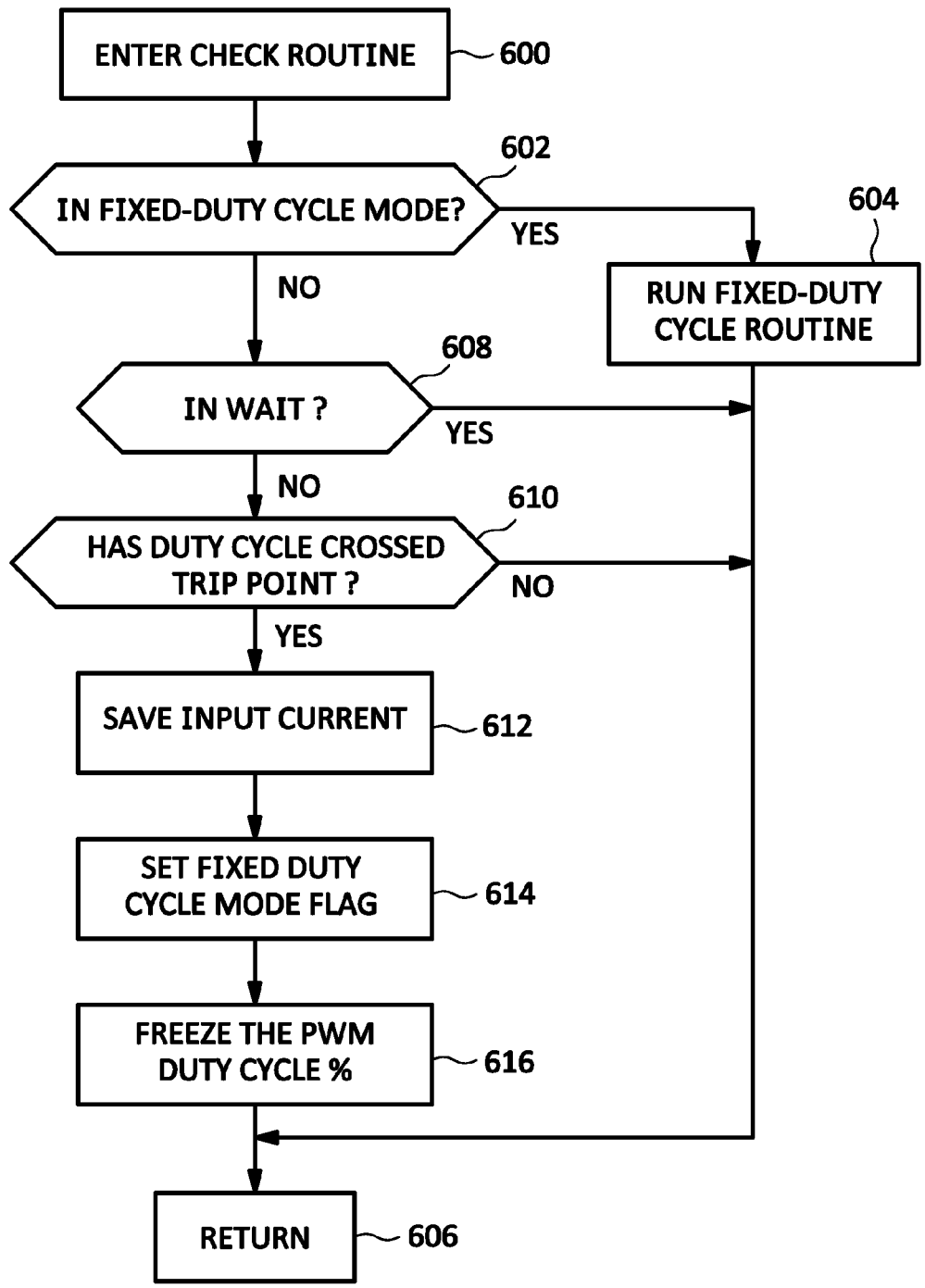
FIGS. 6 and 7 illustrate an example embodiment of a technique for switching between fixed duty cycle and MPPT modes according to some inventive principles of this patent disclosure.
Figure 7:
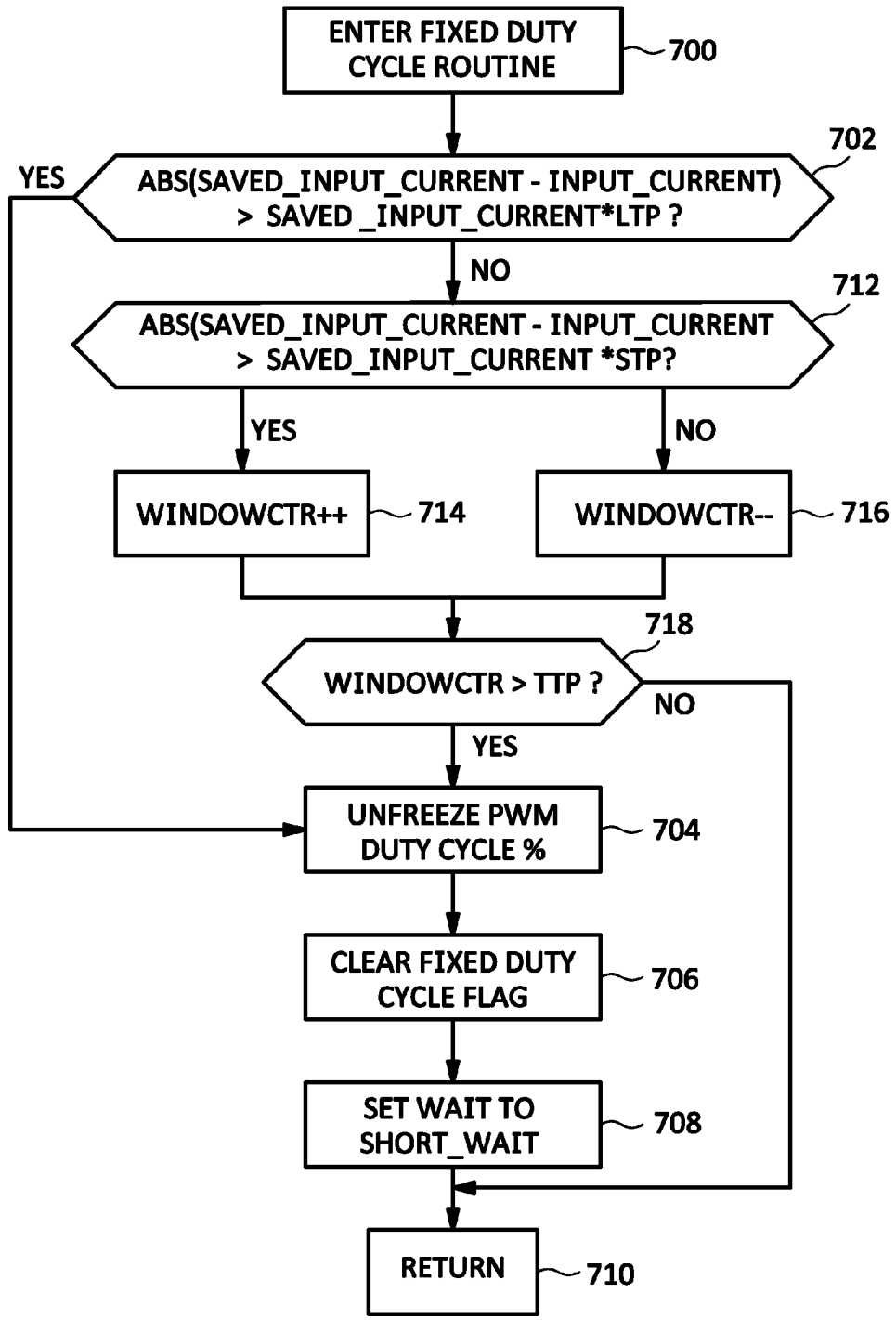

FIGS. 6 and 7 illustrate an example embodiment of a technique for switching between fixed duty cycle and MPPT modes according to some inventive principles of this patent disclosure. The fixed duty cycle check routine illustrated in FIG. 6 may be run at regular intervals during operation of the local power converter. The fixed duty cycle check routine is entered at 600 and proceeds to determine if the system is in fixed duty cycle mode by checking a fixed duty cycle flag at 602. If the controller is already in fixed duty cycle mode, the fixed duty cycle routine at 604 (which is illustrated in FIG. 7)

is run, then the check routine terminates at 606. If the controller is not already in fixed duty cycle mode, a delay loop is checked at 608. If the delay is not over, the check routine terminates at 606. Once the delay is finished, the present duty cycle is compared to a threshold (trip point) at 610. If the trip point has not been reached, the check routine terminates at 606. Once the threshold is reached, the value of the input current is saved at 612, the fixed duty cycle flag is set at 614, and the duty cycle of the converter is frozen at the present value at 616.

Once the system is in fixed duty cycle mode, the open routine shown in FIG. 7 monitors the current in the system at 702 and if it becomes larger than the LargeTriggerPoint (LTP) threshold sets the system back into normal (MPPT) mode at 704-708. If the system spends more time outside of the SmallTriggerPoint (STP) than inside at 712-718 as determined by the length of time set by TTP, the system will also return to normal mode. This second STP window is designed to allow the system to become even more optimized once all the system transients have settled out by providing a method of removing units that are operating at a non-optimal point. This relaxes the requirements on the LTP window, making it easier for the central inverter to find the optimal operating point in the presence of noise and other changing variables.

Figure 8:
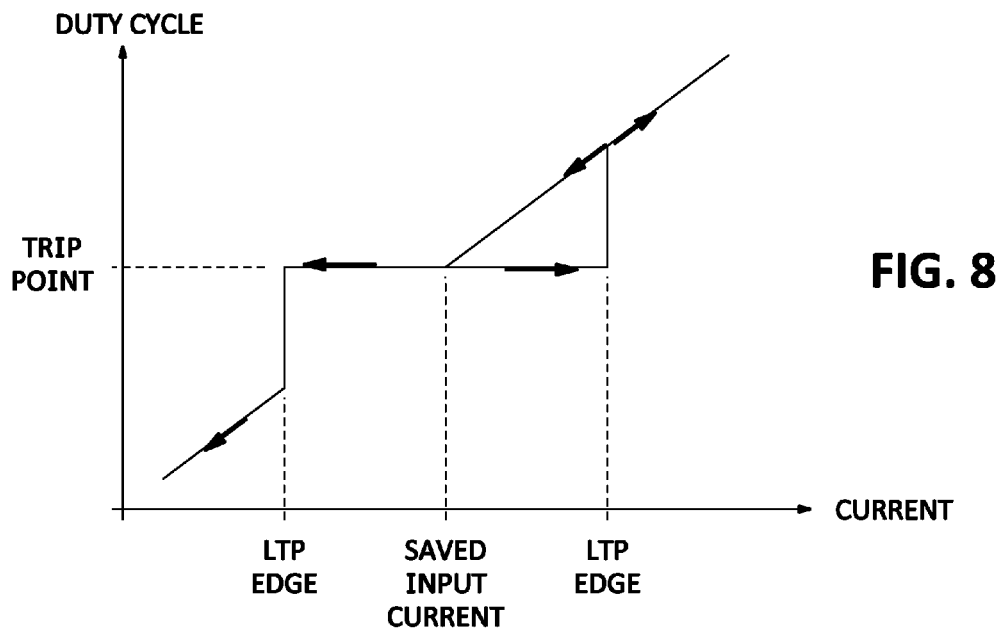
FIGS. 8 and 9 graphically illustrate the interaction between duty cycle and current for increasing and decreasing duty cycles, respectively, for an embodiment of a technique for switching between fixed duty cycle and MPPT modes according to some inventive principles of this patent disclosure.
Figure 9:
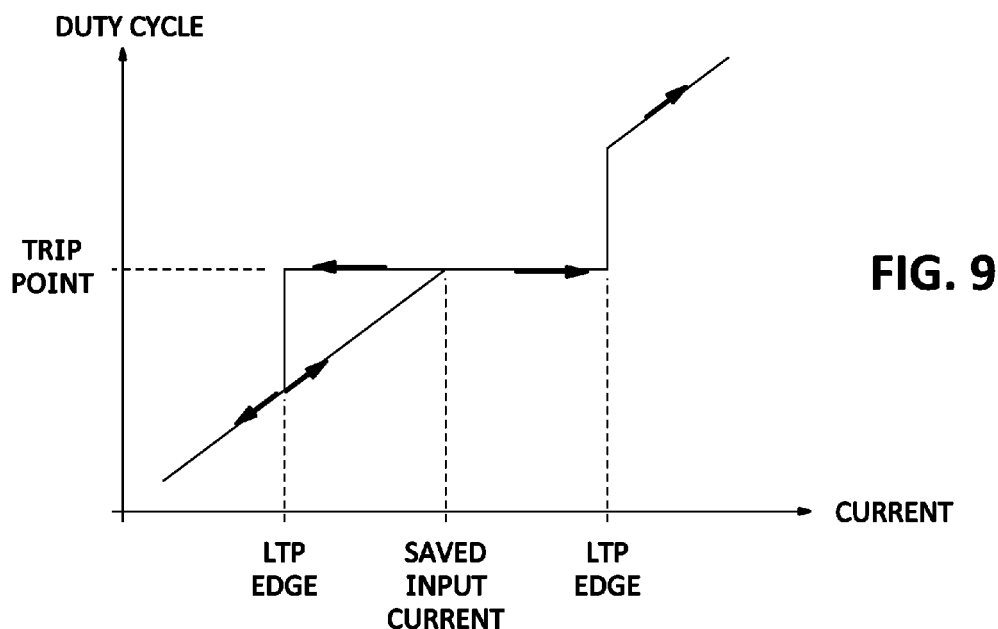

FIGS. 8 and 9 graphically illustrate the interaction between duty cycle and current for increasing and decreasing duty cycles, respectively. As the duty cycle crosses the trip point, it becomes fixed over a range of operating currents defined by the value of LTP. The STP window is not shown on these figures but would be similar, albeit with the locations of the STP edges positioned closer to the value of Saved_input_current.

Thus, some of the inventive principles may be implemented to cause the central inverter voltage to operate in a desired region without needing to make any modifications to the existing inverter hardware or software.

Alternate Modes Method

Some additional techniques for optimizing the operation of a local power converter while interacting with a central power converter according to some inventive principles of this patent disclosure relate to methods in which a controller for the local power converter periodically alternates between two or more modes.

For example, the local power converter, or power optimizer (PO), may alternate (or "ping-pong") between a first mode in which it operates at constant power (CPM or CP mode), and a second mode in which it operates at a constant ratio (CR mode). In constant power mode, constant power is maintained regardless of the output operating point (within limits), and the controller implements an MPPT algorithm to determine a maximum power point. In constant voltage ratio mode, the controller steps (leans) slightly off the maximum power point and maintains a constant ratio between the input and output voltage of the local power converter, thereby providing a certain amount of slope that causes the MPPT algorithm in the central inverter to lock onto the operating point selected by the local power converter rather than the operating point it would have selected on its own. Although stepping off the precise maximum power point may sacrifice a small amount of efficiency at the local power converter, this amount may typically be very small compared to the gain in overall system efficiency.

The controller in the local power converter continuously cycles between these two modes, updating the MPP in CP mode, then presenting a synthesized power slope to the central power converter in CR mode until the voltage ratio is within an ideal range. The relative amount of time spent in each mode may be adjusted, either analytically or empirically, to work with a suitable range of available central power converters. For example, in some embodiments, the controller may operate in CP mode for about 1 second to determine the MPP, then operate in CR mode for about 15 seconds to present a slope to the central power converter.

In some embodiments, an ideal operating point may be implemented as a fixed value that is programmed into the local power converter. In other embodiments, the operating point may be variable and configurable, for example, by an outside source.

Figure 10:
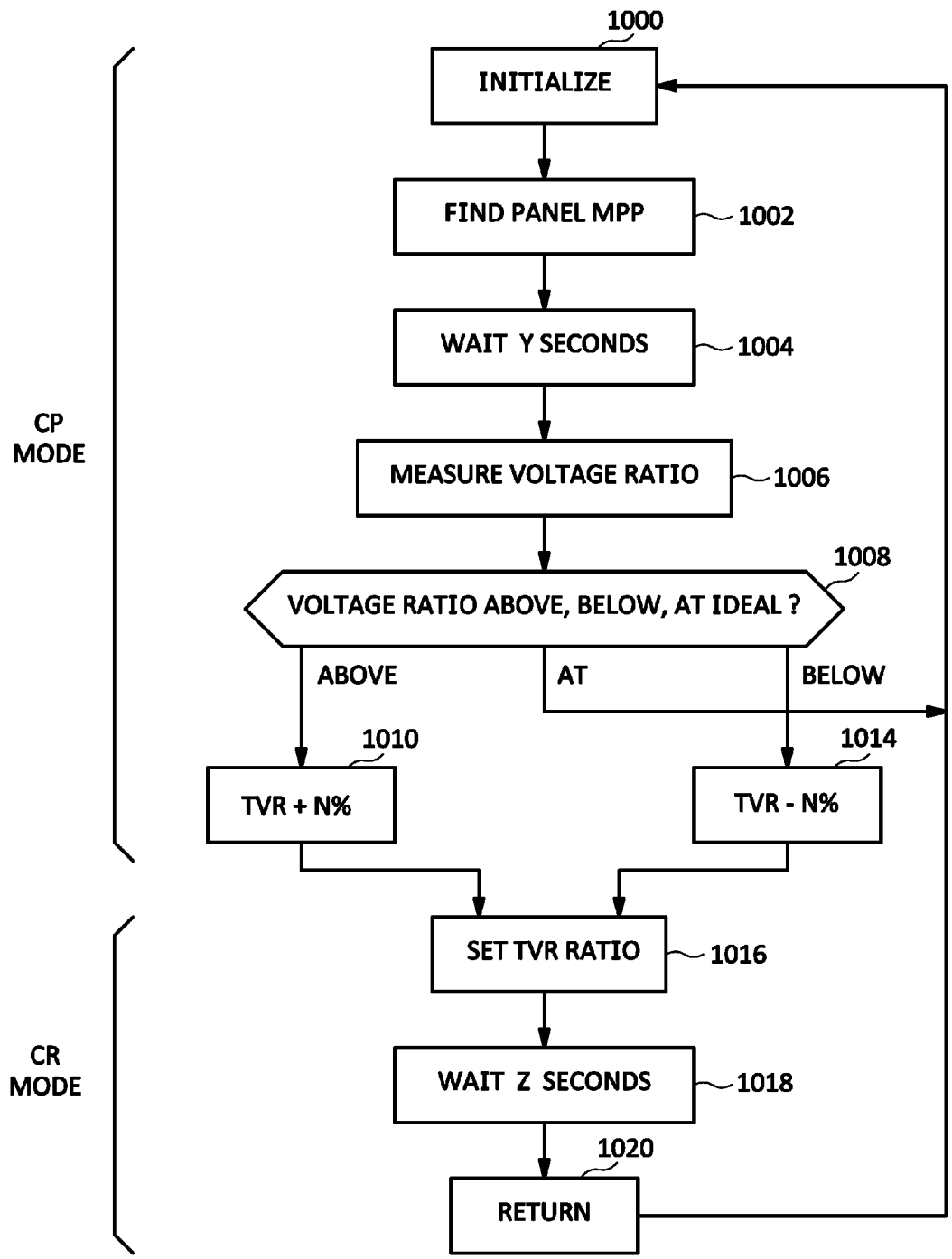
FIG. 10 illustrates an example embodiment of a local/central converter interaction technique utilizing alternating modes according to some inventive principles of this patent disclosure.

FIG. 10 illustrates an example embodiment of a local/central converter interaction technique utilizing alternating modes according to some inventive principles of this patent disclosure. The example of FIG. 10 is described in the context of a PV system, but the inventive principles may be applied to other types of systems including those based on fuel cells, wind turbines, batteries, etc.

The algorithm is initialized at 1000. Constant power mode begins at 1002 where the controller finds the maximum power point for the PV panel. The controller remains in CP mode for Y seconds at 1004, and at 1006, the measured (e.g., filtered) voltage ratio is determined. Calculation of the operating point begins at 1008 where a determination is made was to whether the voltage ratio is below, above or at (within bounds) the ideal operating point voltage ratio.

If the voltage ratio Vr is below the ideal value, then at 1010 the target voltage ratio (TVR) is set to the measured voltage ratio plus N percent. If the voltage ratio Vr is below the ideal value, then at 1014 the TVR is set to the measured voltage ratio minus N percent. If the voltage ratio Vr is at the ideal value (within an acceptable band), then the algorithm returns to the beginning.

Bounds on the value of N used in 1010 and 1014 above may be determined analytically or empirically by testing with a range of commercially available inverters or other central power converters having built-in power point tracking. Moreover, the value of N may be fixed, or a function of any suitable parameter such as Vr.

Once the target value of the TVR is determined, the controller enters constant voltage ratio mode (CR mode) at 1016 where the controller attempts to set the overall system to the desired TVR by stepping slightly off the maximum power point by a certain percentage. The controller remains in CR mode for Z seconds at 1018, then returns to CP mode at 1020.

Figure 11:
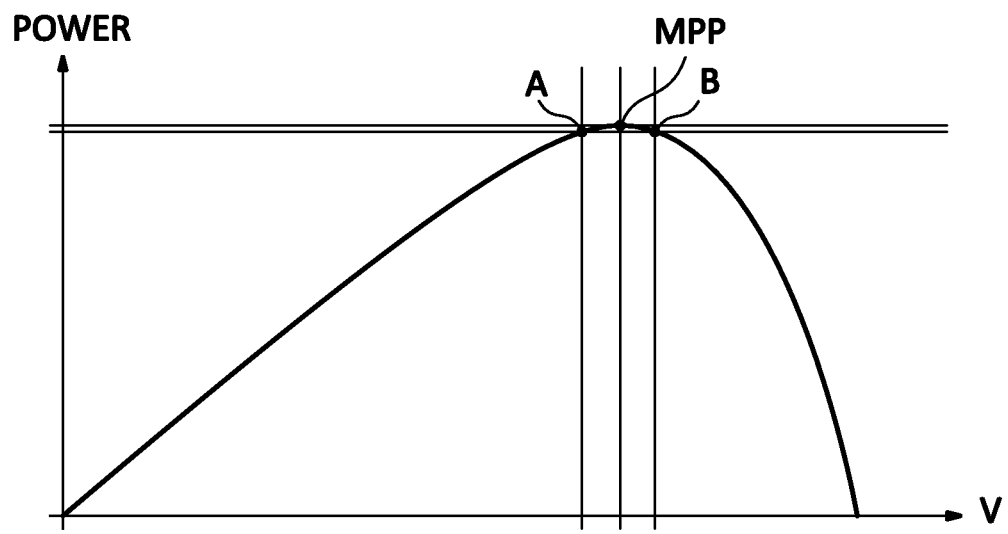
FIG. 11 illustrates an aspect of the operation of the embodiment of FIG. 10.

The operation of the method of FIG. 10 is illustrated graphically in FIG. 11 where the amount that the algorithm steps off the MPP is shown at points A and B corresponding to the value of N used in the corresponding steps in FIG. 10. The operating point of the system constantly alternates between the MPP and point A or point B depending on the direction in which the slope leans.

Constant Impedance Ratio Method

Some additional techniques for optimizing the operation of a local power converter while interacting with a central power converter according to some inventive principles of this patent disclosure relate to methods in which the local power converter uses a constant impedance ratio, or constant slope, to maintain an operating point at an approximately constant distance from the maximum power point.

This may be accomplished, for example, by using the incremental impedance to panel impedance ratio as a control variable for constant slope. An impedance to impedance ratio of one (unity) means that power converter is at its maximum power point. An impedance to impedance ratio of less than one means the PV operating voltage is higher than the maximum power point voltage and vice versa. An impedance to impedance ratio of less than one may cause the central inverter to constantly see higher power at voltages lower than its current operating point and may cause the central inverter to constantly slope down in voltage. An impedance to impedance ratio of greater than one may cause the central inverter to constantly see higher power at voltages higher than its current operating point and may cause the central inverter to constantly slope up in voltage.

The incremental impedance may be expressed as an incremental change in voltage divided by the corresponding incremental change in current. I.e., the incremental impedance may be expressed as $\Delta V/\Delta I$ where $\Delta V$ is an incremental change in voltage, and $\Delta I$ is the corresponding incremental change in current.

The impedance ratio may be determined, for example, by enabling the local power converter to continually perturb the power source at a frequency that is outside of the band that can be monitored by the central power converter. Filters and correlations may then be used to monitor the results of the perturbations by the local power converter independently of the conventional perturbations generated by the central power converter and other system changes. Simultaneously, the perturbations generated by the central power converter are allowed to reach the power source so that the central power converter can determine a direction to move. Because both perturbation loops can operate at the same time, this method may eliminate the need to switch back and forth between modes. The faster loop is used to determine the operating point of the power optimizer. The operating point can then be adjusted to present the desired slope to the central power converter.

Figure 12:
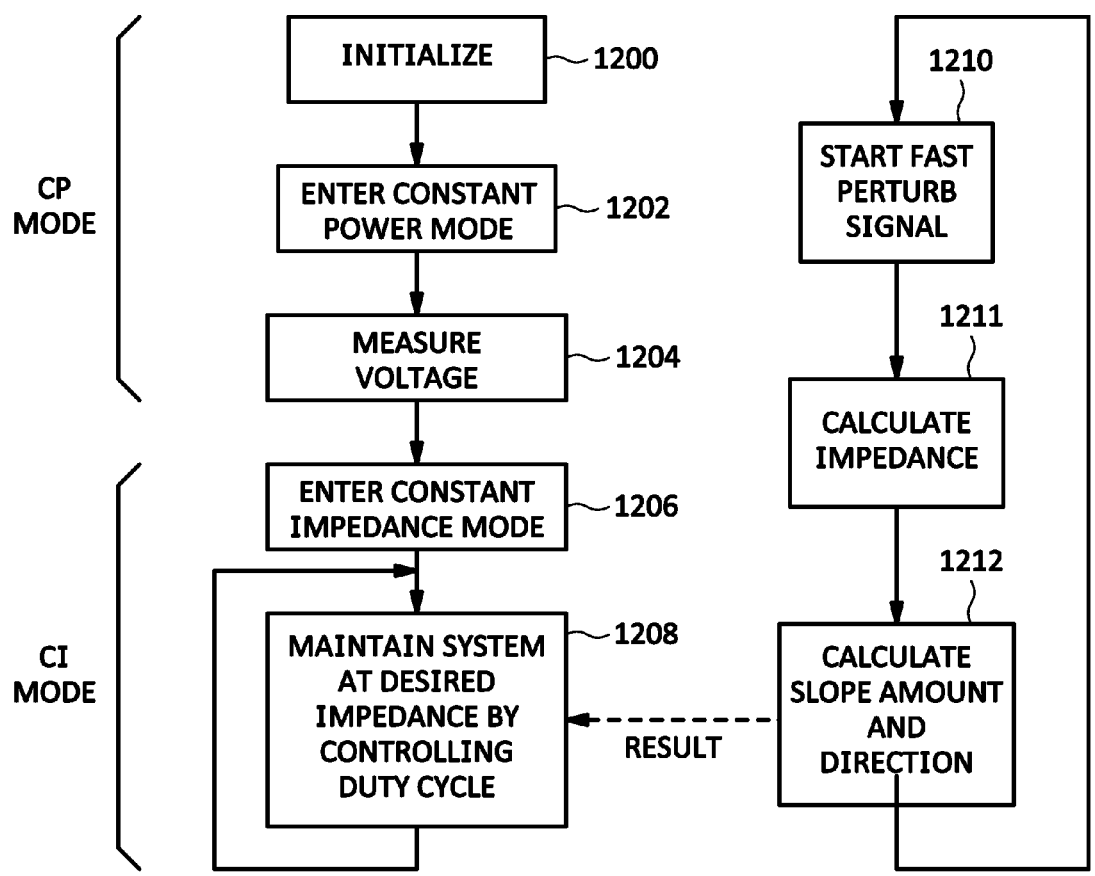
FIG. 12 illustrates an example embodiment of a local/central converter interaction technique utilizing constant slope according to some inventive principles of this patent disclosure.

FIG. 12 illustrates an example embodiment of a local/central converter interaction technique utilizing constant impedance according to some inventive principles of this patent disclosure. The example of FIG. 12 is described in the context of a PV system, but the inventive principles may be applied to other types of systems including those based on fuel cells, wind turbines, batteries, etc.

The algorithm is initialized at 1200. Constant power (CP) mode begins at 1202, and the controller measures the voltages for the local power converter at 1204. Then constant impedance (CI) mode is entered at 1206.

Simultaneously, the faster loop begins running at 1210 where a perturb signal is used to determine the PV panel slope. At 1211, the impedance is calculated, and at 1212, the slope amount and direction are calculated based on the perturbations and corresponding observed voltages, and the desired system operating point. The slope amount and direction output from 1212 are used at 1208 where the system is maintained at the desired impedance by controlling the local power converter duty cycle. The loop around 1208 is substantially slower than the faster loop including 1210-1212, so the perturbations generated by the central power converter make their way back to the PV panel and enable the MPPT functionality in the central power converter to see the shape of the PV panel power curve.

An advantage of a constant impedance ratio method according to the inventive principles of this patent disclosure is that it may eliminate or reduce cycling between constant power mode and constant impedance mode because the calculation of the slope amount and direction can be performed in a faster background loop simultaneously with the slower loop that maintains the system at the desired slope.

Central Converter Perturb Method

Some additional techniques for optimizing the operation of a local power converter while interacting with a central power converter according to some inventive principles of this patent disclosure relate to methods in which the perturbations generated by the central power converter are observed and used to determine a slope direction and amount.

Figure 13:
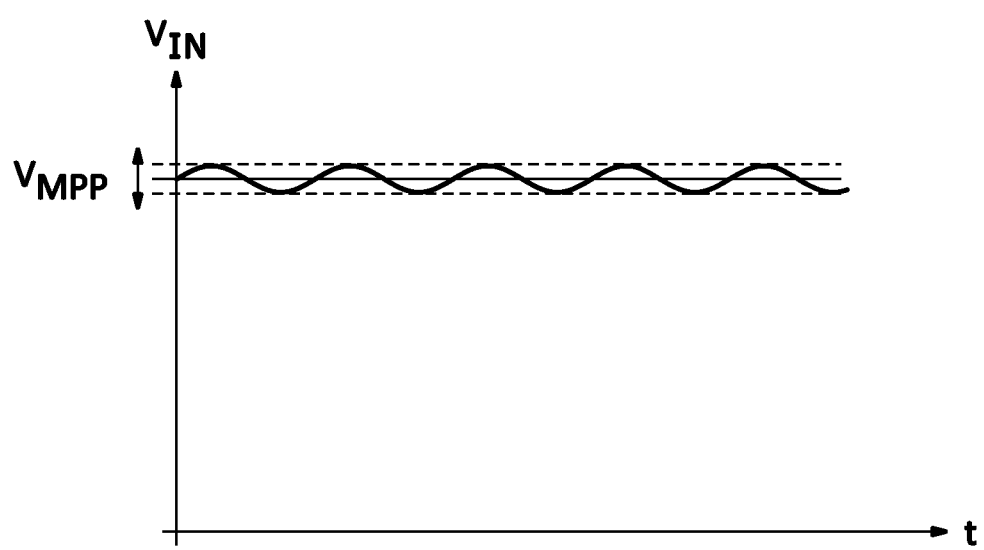
FIG. 13 illustrates the manner in which an MPPT algorithm in a central power converter may generate perturbations about a maximum power point.

For example, FIG. 13 illustrates the manner in which an MPPT algorithm in a central power converter may generate perturbations about a maximum power point $V_{MPP}$ to enable it to maintain its operation about the maximum power point. The controller in the local power converter may allow these perturbations to reach the power source so the controller can observe the AC portion of the perturbations to determine the direction and slope amount. The control loop in the local power converter may then move the DC level up or down as shown by the arrow in FIG. 13 to maintain the voltage ratio such that the inverter perturbations see the desired power curve shape for the power source. Thus, the control loop may control the direction that the PPT feature in the central power converter thinks it should raise or lower its operating point.

Figure 14:
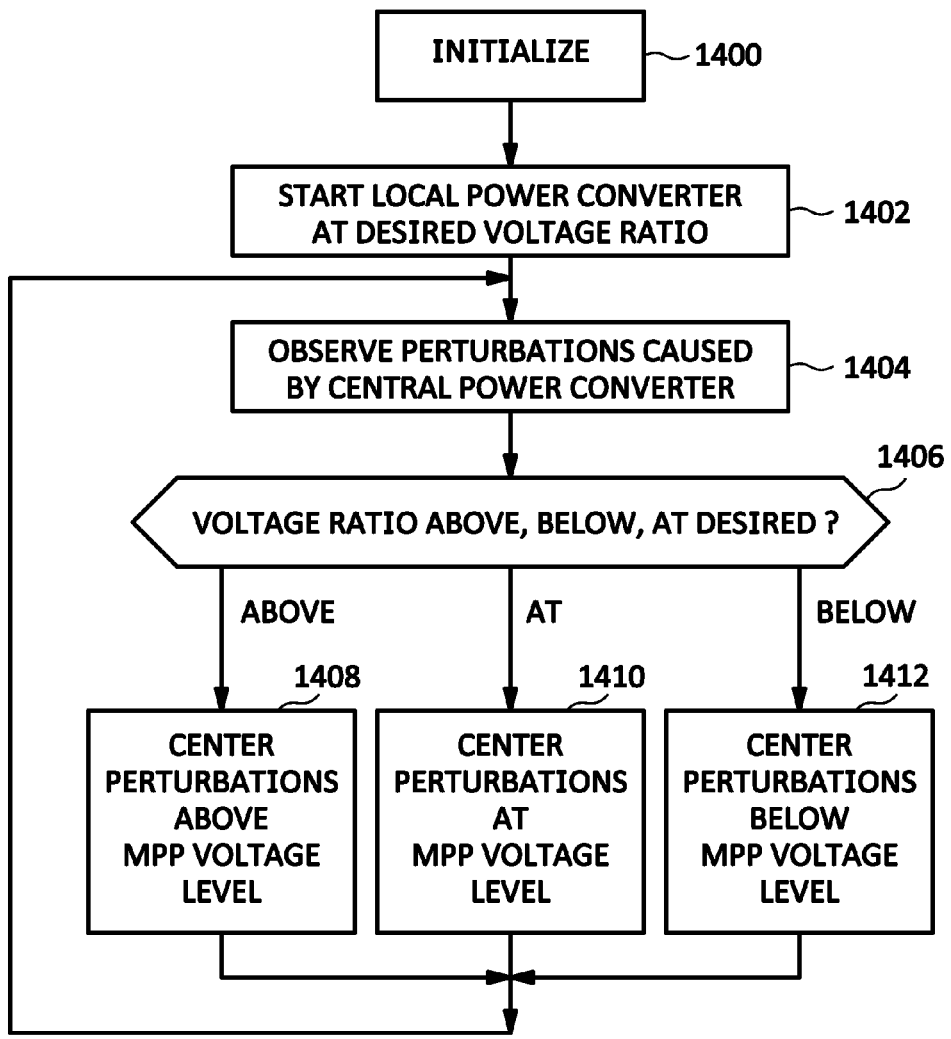
FIG. 14 illustrates an example embodiment of a local/central converter interaction technique utilizing a central converter perturb method according to some inventive principles of this patent disclosure.

FIG. 14 illustrates an example embodiment of a local/central converter interaction technique utilizing a central converter perturb method according to some inventive principles of this patent disclosure. The example of FIG. 14 is described in the context of a PV system, but the inventive principles may be applied to other types of systems including those based on fuel cells, wind turbines, batteries, etc.

The algorithm is initialized at 1400, and at 1402, the local power converter is started at the desired voltage ratio. At 1404, the perturbations caused by the central inverter are observed. At 1406, the controller determines whether the voltage ratio is at, above or below the desired level. If the voltage ratio is above the desired ratio, then at 1408 the DC level is adjusted so the inverter perturbations are centered at a power point above the MPP voltage level such that the lowest voltage excursion reaches the PV panel maximum power point. If the voltage ratio as at the desired level (within bounds), then at 1410 the DC level is maintained so the inverter perturbations are centered at the MPP voltage level. If the voltage ratio is below the desired ratio, then at 1412 the DC level is adjusted so the inverter perturbations are centered at a power point below the MPP voltage level such that the highest voltage excursion reaches the PV panel maximum power point. The control loop then returns to 1404 and continues to maintain the local power converter operating point at a DC level that causes the central inverter to settle in to the operating point selected by the local power converter.

The operation of the method of FIG. 14 is illustrated graphically in FIG. 15 where the variation in the operating point is shown by arrow A when the voltage ratio as at the desired level, arrow B when the voltage ratio is below the desired amount, and arrow C when voltage ratio is above the desired amount.

Figure 15:
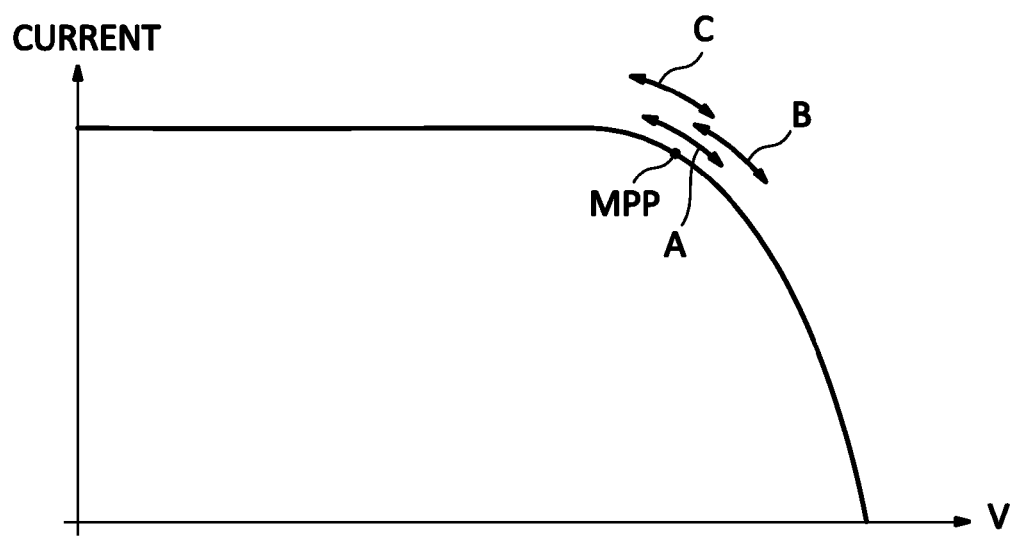
FIG. 15 illustrates an aspect of the operation of the embodiment of FIG. 14.

An advantage of the embodiment illustrated in FIG. 15 is that the maximum power point MPP may always remain within the ripple range of the perturbations of the central inverter.

Coordinated Operation of Power Converters

Some additional inventive principles of this patent disclosure relate to systems in which there is communication between one or more local power converters, and optionally a central power converter. In such a system, one or more additional levels of optimization can take place according to the inventive principles.

For example, in a central inverter system with multiple PV panels and multiple local power converters (power optimizers), optimization may be performed at a system level. Either on a central or on a distributed basis, the local units can monitor the maximum and minimum duty cycles of each local panel power optimizer and make system adjustments to the duty cycle trip points to maximize efficiency. By knowing the efficiency curves and power generation of each device in the system, including the central inverter, the best operating point can be chosen.

Figure 16:
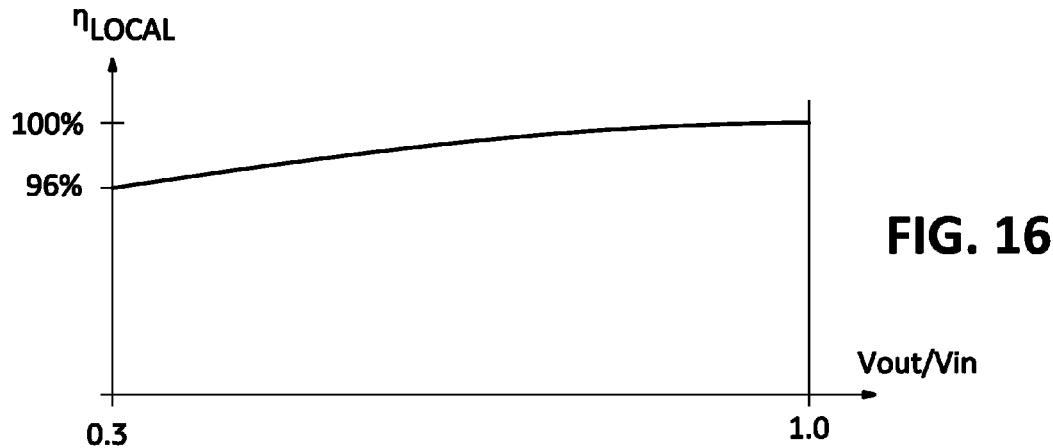
FIGS. 16-18 illustrate efficiency curves for a local power converter, a central power converter, and a composite curve, respectively, according to some inventive principles of this patent disclosure.
Figure 17:
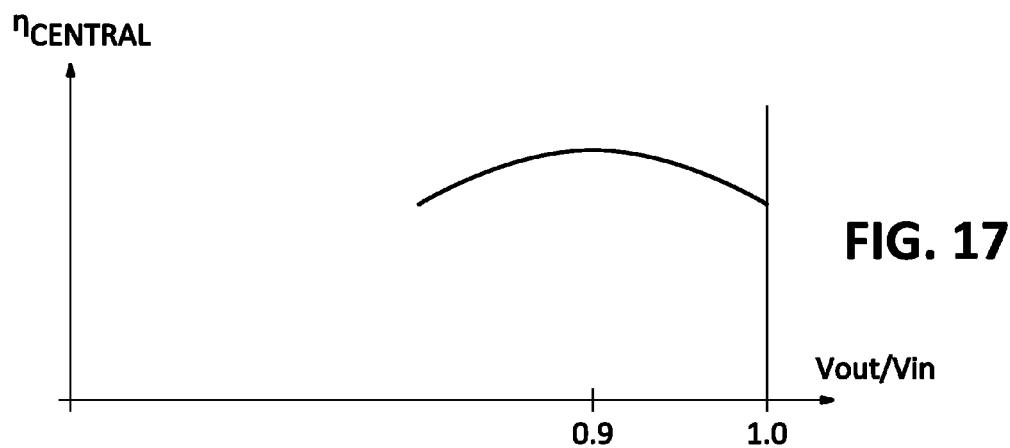
Figure 18:
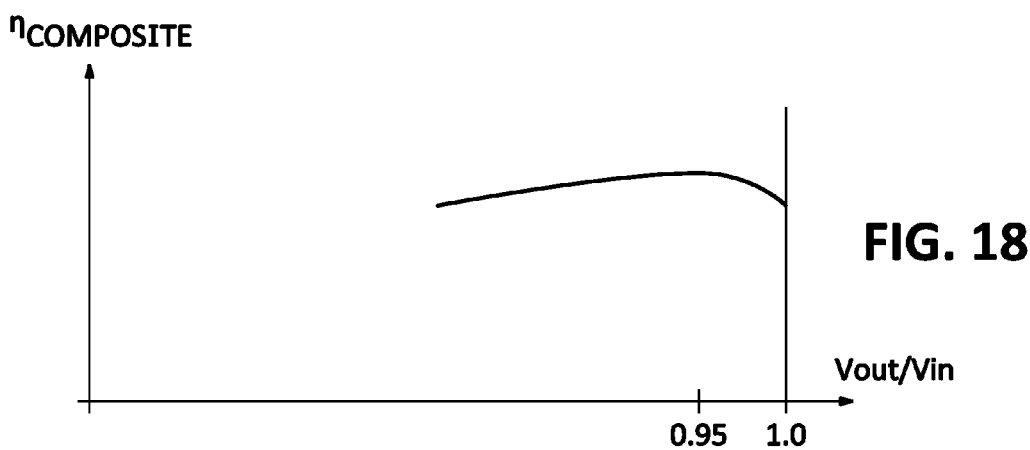

An example embodiment is illustrated with respect to FIGS. 16-18. FIG. 16 illustrates the efficiency curve $\eta_{local}$ for a local power optimizer which has a peak efficiency at Vout/Vin=1.0 volts. FIG. 17 illustrates the efficiency curve $\eta_{central}$ for the central inverter which has a peak efficiency at Vout/Vin=0.9 for a combined string. FIG. 18 illustrates a composite efficiency curve obtained by multiplying $\eta_{local}$ by $\eta_{central}$. Thus, the best overall efficiency may be obtained at Vout/Vin=0.95 even though this operating point is not necessarily the peak efficiency point for any specific component.

Another more specific example is based on the following assumptions: a system has 200 power optimizers installed; each power optimizer in the system handles 250 W of power; at a duty cycle of 50%, a power optimizer is 92% efficient (produces 230 W); at a duty cycle of 80%, a power optimizer is 98% efficient (produces 245 W); in this system 10 units are running at 80% (within the LTP window); and in this system 190 units are running at 50%.

The total power out of the system is 46150 W (10*245 W+190*230 W=2450 W+43700 W). If the 10 units at 80% duty cycle were removed from the system (turned off for example, although that is not necessary it just makes the calculation easier) and the rest of the system was allowed to operate at 80% duty cycle the output power would then be 46550 W (190*245 W). The second system is producing more power and would be the more efficient configuration. This can also be applied to the inverter as well. If the efficiency over input voltage and current for the inverter is known, the system can optimize both its own operating point and the voltage at the input to the inverter to achieve the best overall system operating efficiency.

In some embodiments, the optimization of the system, done by an overall supervisory system or done ad-hoc, at both the local level and the system level may be an important feature. This system optimization information can be used at a high level to adjust system voltages and currents. It can also be used in conjunction with other local power optimizer functions such as phase shedding. With the phase shedding example, if the supervisory system has information about the efficiency curves for each local power optimizer, including the efficiency effects of phase shedding, system voltages and currents can be optimized to make a local power optimizer run with reduced phases, resulting in increased efficiency.

The inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A local power converter comprising:
   a power conversion stage to transfer power from a power source to a central power converter having a power point tracking feature; and
   a controller configured to manipulate the operating point of the local power converter and further configured to generate an instruction providing a direction in which to move along a power point curve of the central power converter, the instruction causing the power point tracking feature of the central power converter to perform an operation to adjust a voltage or a current to achieve an optimal point for operation of the central power converter, the optimal point for operation of the central power converter determined by the controller of the local power converter.

2. The local power converter of claim 1 where the local power converter controller is further configured to:
   determine a maximum power point for the power source;
   determine a slope of the power point curve by using a second point apart from the maximum power point of the power point curve for the power source; and
   provide the slope to the power point tracking feature of the central power converter.

3. The local power converter of claim 1 where the local power converter controller is further configured to permit the power point tracking feature of the central power converter to detect a slope of power curve characteristics of the power source.

4. The local power converter of claim 1 where the local power converter controller is further configured to manipulate the operating point of the local power converter by alternating between at least two modes.

5. The local power converter of claim 4 where the modes include:
   a first mode for determining a maximum power point of the power source; and
   a second mode for influencing the power point tracking feature of the central power converter.

6. The local power converter of claim 5 where:
   the first mode comprises a constant power mode; and
   the second mode comprises a constant voltage ratio mode.

7. The local power converter of claim 1 where the local power converter controller is further configured to manipulate the operating point of the local power converter to provide a constant or substantially constant impedance.

8. The local power converter of claim 1 where the local power converter controller is further configured to keep a difference between the operating point of the local power converter and the maximum power point of the power source substantially constant.

9. The local power converter of claim 1 where the local power converter controller is configured to enable perturbations from the power point tracking feature of the central power converter to reach the power source.

10. The local power converter of claim 9 where the local power converter controller is further configured to implement a control loop, where the control loop functions to perturb the power source at a first frequency that the power point tracking feature of the central power converter is substantially insensitive to.

11. The local power converter of claim 10 further configured with instructions that configure the control loop operating on the local power converter to function to:
   determine the maximum power point of the power source in response to perturbations at the first frequency; and
   control the power point of the local power converter at a second frequency that enables perturbations from the power point tracking feature of the central power converter to reach the power source.

12. The local power converter of claim 11 where the control loop when in operation, serves to:
- calculate a voltage ratio for the local power converter; and
- calculate a power curve slope value and power curve slope direction in response to the voltage ratio.

13. The local power converter of claim 1 where the local power converter controller is further configured to:
- observe perturbations from the power point tracking feature of the central power converter; and
- manipulate the operating point of the local power converter in response to the observed perturbations.

14. The local power converter of claim 13 where the local power converter controller is further configured to maintain the voltage ratio of the local power converter to cause the power point tracking feature of the central power converter to detect a characteristic power curve shape for the power source.

15. The local power converter of claim 13 where the local power converter controller is further configured to use the observed perturbations to determine a power curve slope direction and slope value.

16. The local power converter of claim 13 where the local power converter controller is further configured to cause the perturbations from the power point tracking feature of the central power converter to reach the maximum power point of the power source.

17. The local power converter of claim 1 where the local power converter controller is further configured to operate in a mode to prevent the power point tracking feature of the central power converter from wandering.

18. The local power converter of claim 17 where operating in the mode comprises operating the local power converter at a fixed duty cycle.

19. The local power converter of claim 17 where the local power converter controller is further configured to save a parameter of the local power converter when entering fixed duty cycle operation.

20. The local power converter of claim 19 where the local power converter controller is further configured to stop operating at a fixed duty cycle when the parameter of the local power converter deviates from the saved value by a threshold.

21. The local power converter of claim 20 where deviating from the threshold is accomplished by instantaneously exceeding a first predetermined limit.

22. The local power converter of claim 20 where deviating from the threshold is accomplished by exceeding a predetermined limit for a predetermined length of time.

23. A method for operating a system having one or more power sources, a central power converter, and one or more local power converters coupled between the power sources and the central power converter, the method comprising:
- combining an efficiency characteristic of the central power converter with an efficiency characteristic received from the one or more local power converters for the at least one of the power sources, thereby determining a composite efficiency characteristic for the system; and
- operating the central power converter for the system at or near a maximum of the composite efficiency characteristic by performing an operation at the one or more local power converters to achieve an optimal point corresponding to the efficiency characteristic received from the one or more local power converters.

24. The method of claim 23 where:
- the efficiency characteristic of the central power converter comprises a first efficiency curve; and
- the efficiency characteristic of one of the one or more power sources comprises a second efficiency curve.

25. The method of claim 24 where combining the efficiency characteristics comprises multiplying the first and second efficiency curves.

26. The method of claim 25 where the composite efficiency characteristic is determined on a system-wide basis.

27. The method of claim 23 where the composite efficiency characteristic is determined at a local level.

28. A method for operating a system having a power source, a central power converter, and a local power converter coupled between the power source and the central power converter, the method comprising:
- operating the local power converter in a maximum power point tracking mode to determine the value of a first parameter corresponding to a maximum power point;
- saving the value of the first parameter; and
- operating the central power converter in a fixed duty cycle mode using the value of the parameter received from the local power converter, wherein the local power converter reverts to the maximum power point tracking mode when a measured value of the first parameter deviates from the saved value.

29. The method of claim 28 where:
- the local power converter comprises a switching power converter; and
- the parameter comprises a duty cycle for the switching power converter.

30. The method of claim 28 where the fixed duty cycle mode enables the central power converter to detect the power curve of the local power source through the local power converter.

31. The method of claim 28 further comprising:
- saving the value of a second parameter obtained during maximum power point tracking operation; and
- monitoring the second parameter during fixed duty cycle operation.

32. The method of claim 31 further comprising:
- comparing the monitored value of the second parameter to the saved value of the second parameter during fixed duty cycle operation; and
- changing back to maximum power point tracking operation if the difference between the monitored value and the saved value exceeds a threshold.

* * * * *